(12) United States Patent
Harde et al.

(10) Patent No.: US 6,176,259 B1
(45) Date of Patent: Jan. 23, 2001

(54) FUEL TANK DEVICE

(75) Inventors: Bo Harde, Göteborg; Lars Greger, Angered; Hussein Bakir, Göteborg, all of (SE)

(73) Assignee: Volvo Personvagnar AB (SE)

( * ) Notice: Under 35 U.S.C. 154(b), the term of this patent shall be extended for 0 days.

(21) Appl. No.: 09/509,613

(22) PCT Filed: Aug. 20, 1999

(86) PCT No.: PCT/SE99/01415

§ 371 Date: Mar. 30, 2000

§ 102(e) Date: Mar. 30, 2000

(87) PCT Pub. No.: WO00/10828

PCT Pub. Date: Mar. 2, 2000

(30) Foreign Application Priority Data

Aug. 21, 1998 (SE) .................................................. 9802822

(51) Int. Cl.$^7$ ...................................................... B65B 1/04
(52) U.S. Cl. ........................... 137/587; 137/43; 123/516; 123/518; 123/541; 141/59
(58) Field of Search .................... 123/516, 518, 123/519, 541; 137/587, 334; 141/59

(56) References Cited

U.S. PATENT DOCUMENTS

| 3,610,220 | * | 10/1971 | Yamada et al. | 123/518 |
| 4,024,848 | * | 5/1977 | Lee | 123/516 |
| 4,095,609 | * | 6/1978 | Martin | 137/43 |
| 5,027,780 | | 7/1991 | Uranishi et al. | 123/520 |
| 5,054,508 | * | 10/1991 | Benjey | 137/43 |
| 5,647,334 | | 7/1997 | Miller | 123/520 |
| 5,687,778 | * | 11/1997 | Harris | 141/59 |
| 5,769,057 | * | 6/1998 | Hashimoto et al. | 123/516 |
| 5,819,796 | * | 10/1998 | Kunimitsu et al. | 137/587 |

FOREIGN PATENT DOCUMENTS

| 0 790 144 A2 | 8/1997 | (EP) . |
| 2 288 795 | 11/1995 | (GB) . |

* cited by examiner

*Primary Examiner*—A. Michael Chambers
(74) *Attorney, Agent, or Firm*—Lerner, David, Littenberg, Krumholz & Mentlik, LLP

(57) ABSTRACT

Apparatus is disclosed for venting a fuel tank including a canister containing an absorbent for fuel fumes, a sensor for detecting the filling of the fuel tank and emitting a signal based thereon, a first connection line for connecting the canister with the fuel tank and having a sufficient size to permit the free flow of gases from the fuel tank during filling of the fuel tank, the first connection line including a first valve operable between an open position and a closed position, the first valve normally being in the closed position and being actuatable into the open position by the signal thereby permitting the free flow of gas from the fuel tank through the first connection line during filling, a second connection line for connecting the canister with the fuel tank and connected to the first connection line between the first valve and the canister, the second connection line including a second valve including at least one restrictor for substantially limiting the flow of gases therethrough as compared to the first connection line when the first valve is in its open position, and a condenser for condensing fuel fumes passing through the second connection line such that the condensed fuel can return to the fuel tank.

7 Claims, 1 Drawing Sheet

FUEL TANK DEVICE

FIELD OF THE INVENTION

The present invention relates to a venting system for fuel tanks. More particularly, the present invention relates to such a system comprising at least one canister containing an absorbent for fuel fumes and a connection path for the passage of gases, extending between the fuel tank and the canister.

BACKGROUND OF THE INVENTION

Venting systems of the type described above are used in passenger cars in order to reduce the emission of fuel in gaseous form to the environment. The canister thus functions to absorb fuel fumes which have to be evacuated from the tank when the latter is filled up with gasoline and the free space above the fuel level decreases. Normally, the canister is, in turn, controllably connected with the engine suction or intake system, for emptying the canister of absorbed fuel during engine operation. Such a system is described in the British Patent Application No 2,286,182.

In the system according to the above British Patent Application, the connection path, normally a line in the form of a conventional pipe between the tank and the canister, must be sized so as to be able to evacuate those gas volumes from the tank that are replaced with fuel at the same rate as they are filled with the fuel, in order not to build up a counter-pressure that will shut off the orifice of the gasoline pump prematurely. When filling is then finished, and the car is operated, the fuel is consumed, causing the free volume above the fuel to increase, but the rate of change of the free volume is considerably smaller than during filling up the tank, and the flow of air to the tank needed to avoid a vacuum therein is relatively small. For this flow, the line is thus clearly over-sized. When emptying the canister, a line is normally used (see line No. 15 in British Patent Application No. 2,286,182) between the canister and the open air for replacing the gases being sucked from the canister by the engine, such that substantially no gases are taken from the tank and, in general, no flow is created from or any vacuum in the tank.

When operating vehicles having systems of this kind, fuel fumes are forced into the line and the canister due to e.g. decreasing ambient atmospheric pressure or decreasing exterior temperature, especially when travelling a distance including substantial level changes. As the line between the tank and the canister is sized to allow large flows, a rapid displacement of relatively large quantities of air, in some cases saturated with fuel, may occur, causing fuel to condense in the line and/or in the canister instead of being absorbed by the canister contents. This will cause operational disturbances, in the worst case serious enough to stall the engine due to an incorrect fuel/air mixture (too rich).

An object of the present invention is to provide an improved device for fuel tanks, eliminating the problems described above.

SUMMARY OF THE INVENTION

This and other objects have now been realized by the invention of apparatus for venting a fuel tank comprising a canister containing an absorbent for fuel fumes, a sensor for detecting the filling of the fuel tank and emitting a signal based thereon, a first connection line for connecting the canister with the fuel tank, the first connection line having a size sufficient to permit the free flow of gases from the fuel tank during the filling of the fuel tank with the fuel, the first connection line including a first valve operable between an open position and a closed position, the first valve normally being in the closed position and being actuatable into the open position by the signal, thereby permitting the free flow of the gases from the fuel tank through the first connection line during the filling of the fuel tank, a second connection line for connecting the canister with the fuel tank, the second connection line being connected to the first connection line between the first valve and the canister, the second connection line including a second valve including at least one restrictor for substantially limiting the flow of gases therethrough as compared to the first connection line when the first valve is in the open position, and a condenser for condensing fuel fumes passing through the second connection line whereby the condensed fuel can return to the fuel tank. In a preferred embodiment, the fuel tank includes a filling line. Preferably, the condenser comprises a cooler. In a preferred embodiment, the apparatus includes a pressure equalization line disposed between the interior of the cooler and the filling line.

In accordance with one embodiment of the apparatus of the present invention, the cooler includes an inlet for connection to the fuel tank and an outlet for connection to the first connection line, the outlet from the cooler being located in a vertical position higher than the inlet for the cooler.

In accordance with another embodiment of the apparatus of the present invention, the fuel tank includes a filler cap, and the sensor is adapted to emit the signal when the filler cap is not fitted to the fuel tank.

In accordance with another embodiment of the apparatus of the present invention, the second connection line includes a rollover valve located between the fuel tank and the second valve.

The present invention consists of a venting system comprising a sensing device for detecting and emitting a filling-up signal during filling of the tank. Furthermore, the system is constructed such that the connection path between the tank and the canister is selectively adjustable, through a valve means depending on the sensing device, between at least two modes; a first mode allowing filling-up flow, for enabling the full through flow of gases when a filling-up signal is present; and a second mode allowing a lower flow compared to the filling-up flow, for enabling a restricted through flow of gases, compared to the completely open mode, when no filling-up signal is present.

By means of a system according to the present invention, the risk of amounts of fuel, large enough to disturb the engine during operation, condensing in or at the canister is reduced, whereas the filling-up properties of the system remain unchanged.

In a preferred embodiment of the present invention, the invention comprises the connection path comprising a first line, extending between the tank and the canister and being sized for evacuating the fumes forced out when filling up the tank with fuel, a first valve means arranged in that line, the valve means being adjustable between a completely open and a completely closed position, a second line, extending between the tank and a location on the first line, downstream of the first valve means, towards the canister, and by a second valve means arranged in the second line, containing at least one restriction, allowing a substantially smaller flow than the first valve means in its open position, the first valve means functioning to assume its open position only when a filling-up signal is present, corresponding to the first mode, and otherwise to assume a closed position, whereby a restricted flow may pass through the other line, i.e. the second mode. In such a system, the size of the second line can be selected for a lower flow than that of the first line, and it can also be dimensioned, regarding its length and extension, in such a manner that any condensation required can occur in the line, downstream of the second valve means, towards the tank, at a safe distance from the canister.

In order to further improve the system, the second line may, in accordance with the present invention, comprise a device for condensing passing fuel fumes, the line preferably being arranged to convey fuel condensing therein back to the tank. The condensing device can then preferably consist of a cooler, cooled by the surrounding air.

In order for the system to function, it comprises a sensing device emitting a signal indicative of filling up. According to the present invention, it is suitable that the sensing device functions to sense if the filler cap is on, and to emit a filling-up signal when the filler cap is not on.

BRIEF DESCRIPTION OF THE DRAWINGS

The present invention will be more fully appreciated with reference to the following detailed description which, in turn, refers to the enclosed drawings, wherein.

DETAILED DESCRIPTION

Figure 1:
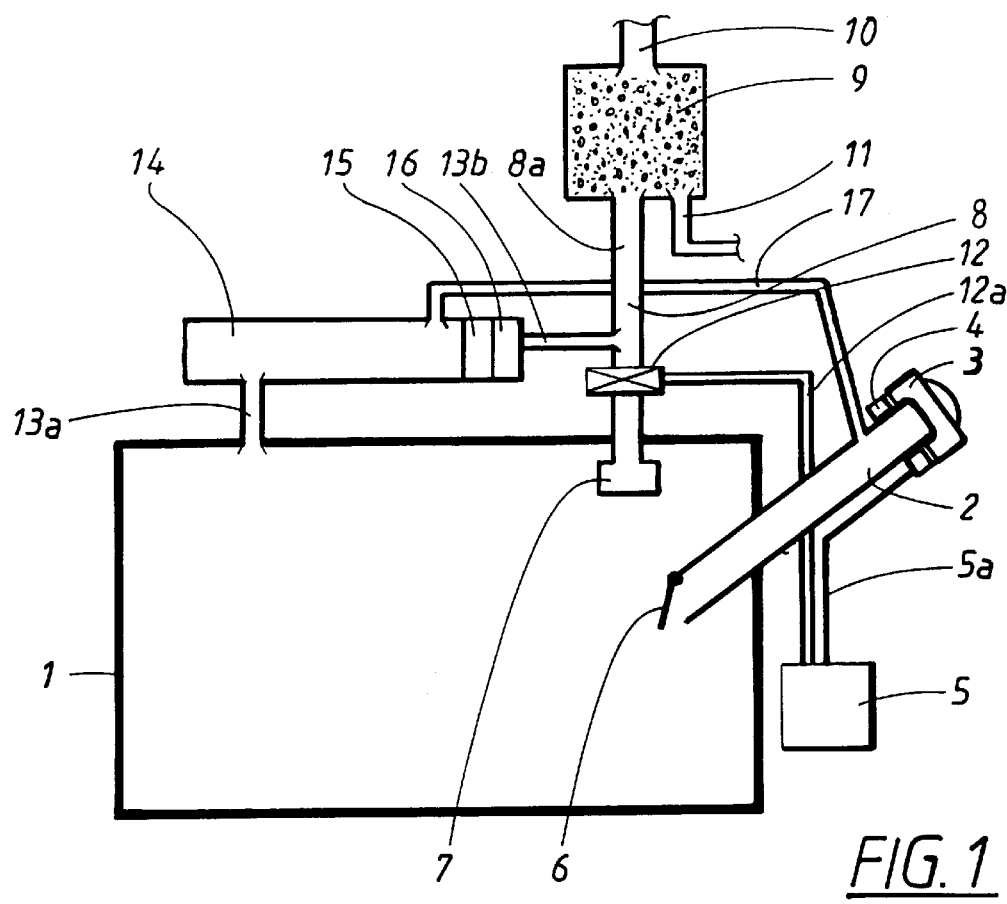
FIG. 1 is a side, elevational, schematic representation of a preferred embodiment of the present invention.

As may be seen from FIG. 1, a venting system according to the present invention comprises a fuel tank 1, having a filler tube 2 for fuel. At the exterior end of the filler tube 2 there is a filler cap 3 that, in the mounted position, is arranged to co-operate with a sensing device 4. When the filler cap is removed, the sensing device will indicate same, which is interpreted by an electronic unit 5, through a connecting line 5a as a "filling-up condition", a term to be explained further below. The sensing unit may preferably be of the type described in the International Patent Application No. PCT/SE98/01001 (or Swedish Patent Application No. 97/93947), which are incorporated herein by reference thereto. At that end of the mouth of the filler tube in the tank, there is, in a known manner, a flap 6, movably suspended in order to prevent fuel being thrown up into the filler tube by rapid pressure changes.

In the upper portion of the fuel tank 1, a valve housing 7 is arranged. The valve housing 7 contains a float valve of a known kind (not shown in detail), functioning to be closed by rising fuel when the tank should not be filled up more, i.e. when a "full" tank has been reached. From the valve housing 7, a first line 8 is running to one end of a canister 9 containing an absorbent, usually active carbon, absorbing the fuel fumes in the mixture of air and fuel fumes flowing through the line 8 from the tank 1, in order to avoid emissions to the ambient atmosphere.

The canister 9 is, at its other end, connected to a line 10, which in a known manner is connected to the intake system of an engine (not shown), either directly or by way of a valve for controlled draining of the absorbed fumes in the canister. The canister is, in a known manner, also connected to another line 11, which normally, by means of a valve (not shown) opens to the ambient atmosphere.

In the line 8 there is a main valve 12, functioning to be controlled, by means of the (dual) line 12a, by the electronic unit 5. The valve 12, which is preferably of the solenoid-operated type, has two positions; namely, open and closed. Preferably, in this application, the valve is closed in the non-activated state and open in the activated state. Upon indication from the sensing device 4 that a filling-up mode is present, the electronic unit functions to maintain the valve 12 in its open position through activation of its solenoid. As fuel from a pump nozzle (not shown) is flowing into the tank 1, the free volume inside the tank is reduced, the pressure increases and fuel fumes will flow through the line 8 to the canister 9, where the fumes are absorbed. As modern fuel pumps are provided with devices sensing the counter-pressure inside the tank, in order to be able to automatically shut off the fuel supply, the line 8 and the canister 9 must be sized so as to be able to "swallow" such a large gas flow that the pressure in the tank is held down and the automatics will not shut off the pump until the tank is full, i.e. when the float valve in the valve housing 7 closes, causing the counter-pressure to rise rapidly.

When the filler cap is replaced onto the filler tube 2, the filling-up indication disappears, and the valve 12 closes, as the activation of its solenoid ceases. In order to nevertheless allow the necessary gas transport to and from the tank 1 in dependence of pressure variations therein, there is a second line 13a, b provided between the tank 1 and the first line 8, the second line 13 being connected to the first line 8 at that portion 8a thereof extending between the valve 12 and the canister 9, that is downstream of the valve 12 during filling. In the line 13 and in series connection with each other there are also a cooler 14, a known and therefore not further shown so-called rollover valve 15, and a restrictor valve 16, the flow conductivity of which determines the flow through the second line 13a, b. When the main valve 12 is closed, fuel fumes may thus flow through the line 13a to the cooler 14, by means of the normally open rollover valve 15, the restrictor valve 15 and the line 13b and the first line 8 to the canister, and vice versa, but the flow is limited by the restrictor valve 16 and cannot reach the same level as the flow in the line 8 during filling. The restrictor valve 16 is thus dimensioned so that the flow of gas to the canister attainable at the maximum conceivable pressure difference between the pressure within the tank 1 and the pressure inside the canister, can be absorbed in the canister, even by a saturated gas mixture.

In order to ensure that no condensed fuel reaches the canister, the cooler 14 is provided in the line 13a, b. This could preferably be a hollow body made of extruded aluminium or another material with a high heat conductivity, provided with internal ducts and external cooling flanges and being cooled by passing air, e.g. the speed wind. When fuel fumes flow up into the cooler through the line 13a, they will, due to the relatively lower temperature of the cooler, condense inside the cooler 14, whereby the pressure therein, and thus in the tank 1, will decrease, and the onward flow towards the canister will be limited. The condensed fuel may, from the bottom of the cooler 14, reach the line 13a and flow back down into the tank 1. The other exit from the cooler 14 should preferably be arranged at a vertically higher position than the exit to the line 13a, in order to prevent the condensed fuel from flowing out through that other exit.

In order for an unwanted pressure not to occur above any fuel located inside the filler tube 2, at the section thereof closest to the filler cap 3, when the fuel level in the tank 1 is higher than the lower end of the filler tube 2 inside the tank 1, there is a pressure equalising tube 17 provided between the interior of the cooler 14 and the section of the filler tube 2 located adjacent to the filler cap 3.

Figure 2:
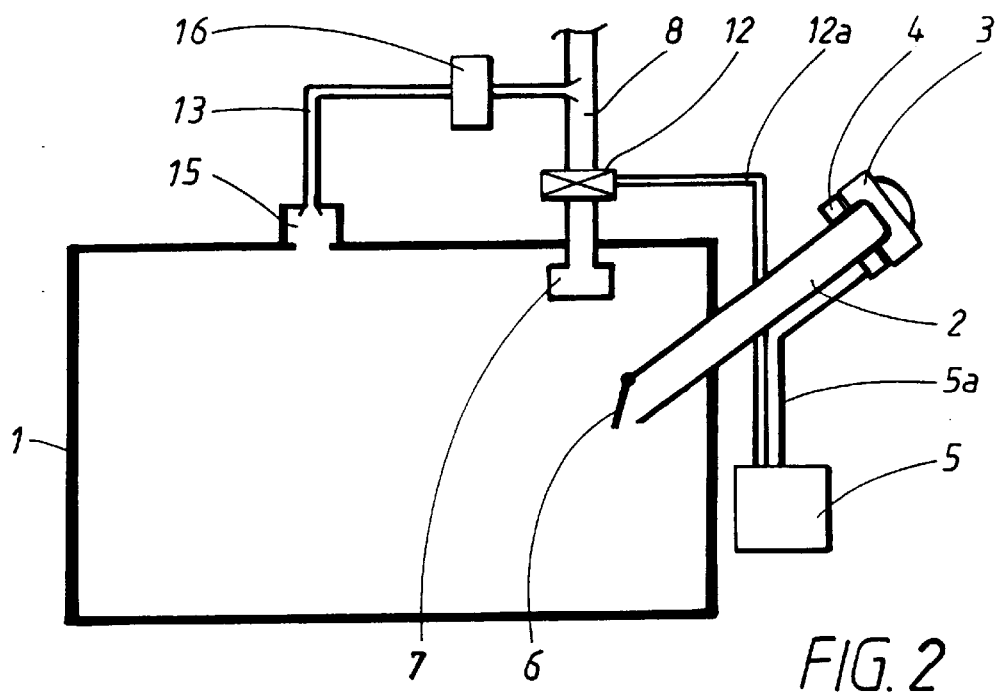
FIG. 2 is a side, elevational, schematic representation of an alternative embodiment of the present invention.

FIG. 2 illustrates an alternative, somewhat simpler embodiment of the present invention. In the figure, those components already described in FIG. 1 have the same reference numerals. The system functions in substantially the same way as the system according to FIG. 1. The canister and its connections, as well as the pressure equalising tube have been omitted for the sake of clarity, as these arrangements are analogous. In the system shown in FIG. 2, the rollover valve 15 is arranged directly at the tank, and in line 13, the restrictor valve 16 is arranged separately. The restrictor valve 16 in this case has the same function as in the system of FIG. 1, that is to allow pressure equalisation and flow between the tank 1 and the canister, but to prevent the canister from being flooded by fuel fumes and possibly even condensed fuel, which, particularly in the above-discussed case of driving in mountain areas, would have been a risk unless the valve 12 had blocked the first line 8. In this manner, the line 13 also functions as a simple cooler and condenser, the condensed fuel flowing back to the tank by means of the rollover valve 15.

The venting system according to the present invention is particularly suitable for integration into systems of the ORVR type ("On Board Refuelling Recovery System"), used and prescribed in the US. Such systems commonly comprise a sensing device indicating the pressure in the tank during the leak-proofing tests performed by this diagnostic system. The type of fuel is of no importance in this context, although gasoline is more volatile than e.g. diesel fuel, naturally entailing larger problems.

The present invention is not limited to the examples shown in the drawing and presented in the description, but several embodiments are conceivable within the scope of the appended claims. For example, the valve 16 may be adjustable into two different degrees of restriction, allowing a larger flow in the direction from the canister to the tank than vice versa. The degree of restriction of the valve might be selected with the aid of known electronics, preferably incorporated in the unit 5, and pressure sensors connected thereto, possibly comprised in an ORVR system and functioning to sense the pressure conditions in the canister and the tank, respectively. The rollover valve 15 might be integrated in the same housing as the restrictor valve 16, and both or one of them could be integrated into the cooler housing 14. The sensing device for detecting if the filler cap is on or off could also be a different type than that described here, for example having direct contacts at the cap, but it is of course important to remember that in such a case, the risk of sparks caused by the closing of current circuits must be completely eliminated.

In a very simple variant of the present invention, the main valve 12 is of a type having at least one fully open position and, furthermore, a partially open position, whereby the valve is brought to the fully open position during filling up, and will otherwise be in its partially open, restricted opening position. Although an excessive flow to the canister can be prevented in this manner, the condensing effect will however be substantially better with a system according to the preferred embodiment according to FIG. 1.

Finally, the cooler could alternatively be an active cooling device, e.g. a cooler of the Peltier type.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for venting a fuel tank comprising a canister containing an absorbent for fuel fumes, a sensor for detecting the filling of said fuel tank and emitting a signal based thereon, a first connection line for connecting said canister with said fuel tank, said first connection line having a size sufficient to permit the free flow of gases from said fuel tank during the filling of said fuel tank with said fuel, said first connection line including a first valve operable between an open position and a closed position, said first valve normally being in said closed position and being actuatable into said open position by said signal, thereby permitting the free flow of said gases from said fuel tank through said first connection line during said filling of said fuel tank, a second connection line for connecting said canister with said fuel tank, said second connection line being connected to said first connection line between said first valve and said canister, said second connection line including a second valve including at least one restrictor for substantially limiting the flow of gases therethrough as compared to said first connection line when said first valve is in said open position, and a condenser for condensing fuel fumes passing through said second connection line whereby said condensed fuel can return to said fuel tank.

2. The apparatus of claim 1 wherein said fuel tank includes a filling line.

3. The apparatus of claim 2 wherein said condenser comprises a cooler.

4. The apparatus of claim 3 including a pressure equalization line disposed between the interior of said cooler and said filling line.

5. The apparatus of claim 3 wherein said cooler includes an inlet for connection to said fuel tank and an outlet for connection to said first connection line, said outlet from said cooler being located in a vertical position higher than said inlet for said cooler.

6. The apparatus of claim 1 wherein said fuel tank includes a filler cap, and wherein said sensor is adapted to emit said signal when said filler cap is not fitted to said fuel tank.

7. The apparatus of claim 1 wherein said second connection line includes a rollover valve located between said fuel tank and said second valve.

* * * * *